G. A. LEONARD.
BRACKET FOR SUPPORTING THE PRESTOLITE TANKS ON MOTOR CYCLES.
APPLICATION FILED FEB. 17, 1914.
1,124,924.
Patented Jan. 12, 1915.
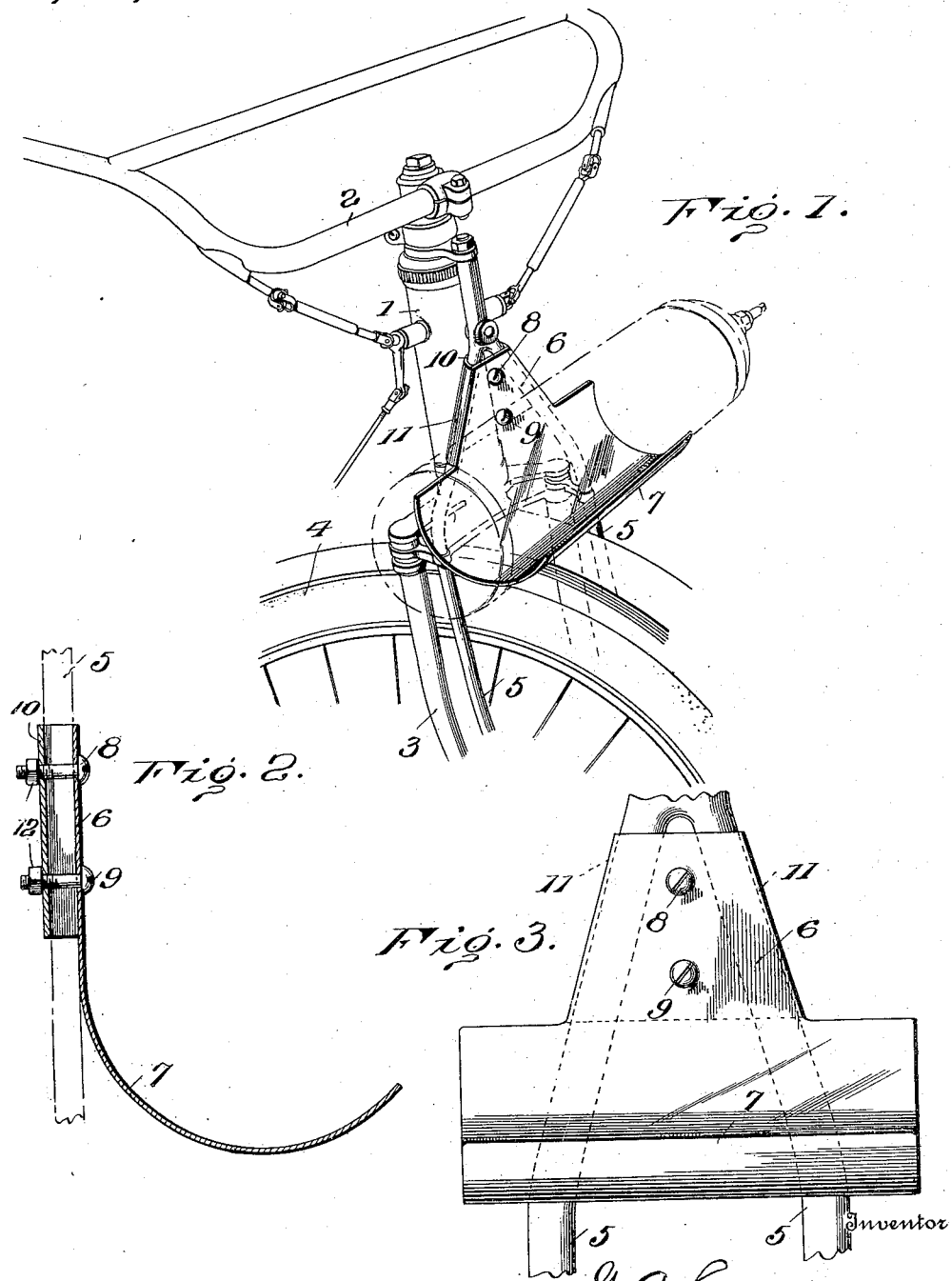

UNITED STATES PATENT OFFICE.

GEORGE A. LEONARD, OF BURLINGTON, VERMONT.

BRACKET FOR SUPPORTING THE PRESTOLITE-TANKS ON MOTOR-CYCLES.

1,124,924.      Specification of Letters Patent.      Patented Jan. 12, 1915.

Application filed February 17, 1914. Serial No. 819,251.

*To all whom it may concern:*

Be it known that I, GEORGE A. LEONARD, a citizen of the United States, residing at Burlington, in the county of Chittenden and State of Vermont, have invented certain new and useful Improvements in Brackets for Supporting the Prestolite-Tanks on Motor-Cycles, of which the following is a specification, reference being had therein to the accompanying drawing.

My invention relates to improvements in brackets for supporting the presto-lite tanks on motor cycles.

The object of my invention is to provide a bracket of this character which can be readily attached to the auxiliary forks of the front wheel of a motor cycle and in which the presto-lite tank is at position where it is rigidly supported so that it will not inconvenience the rider.

Another object of my invention is to provide a simple, cheap and more effective bracket of this character having certain details of structure hereinafter more fully described.

In the accompanying drawings: Figure 1 is a perspective view of the forward wheel and frame of a motor cycle showing my improved bracket applied and showing my presto-lite tank in dotted lines. Fig. 2 is a vertical sectional view of Fig. 1. Fig. 3 is a front view of Fig. 1.

The presto-lite tank on motor cycles have heretofore been placed just above the gasolene tank below the handle bars, and in such structures the tank is greatly in the way of the operator in both mounting and dismounting. The object of this invention is to so place the tank that it will be entirely out of the way of the operator.

Referring now to the drawing, 1 represents the head of the motor cycle and 2 the handle bars which extend rearwardly in easy reach of the operator. The head 1 carries the usual forks 3 in which is mounted the wheel 4 and the auxiliary fork 5 all of which is of the usual form of motor cycle now used on the Indian motor cycle. My improved bracket consists of a flat portion 6 of a size and shape to fit over the outer face of the upper end of the auxiliary fork 5 and has at its lower end the curved tank supporting portion 7 which is of a length considerably greater than the width of the flat portion 6. As heretofore stated, the flat portion 6 is of a width to extend across the outer face of the auxiliary fork 5 and passing through the center of this flat portion are the bolts 8 and 9 which pass between the members of the fork 5 and through a curved plate 10 which is of the size and shape to fit the upper end of the auxiliary fork 5, and has its ends curved outwardly as indicated at 11 to encircle a portion of the fork and abut the rear face of the straight portion 6 of the bracket. The bolts 8 and 9 pass through this plate 10 and have nuts 12 thereon, whereby the bracket is rigidly locked upon the upper end of the auxiliary fork 5. The taper of the straight horizontal portion 6 and the plate 10 and its outwardly curved ends 11 prevent any downward movement of the bracket on the fork as it will be readily seen in Figs. 1 and 3 of the drawing. The curve of the portion 7 of the bracket is in the arc of a circle, and the presto-lite tank is adapted to snugly fit the same, and is held thereon by straps or any other means. By this structure, it will be seen that I have provided a bracket in which the presto-lite tank is rigidly supported by a motor cycle at a position wholly out of the way of the operator, and yet at such a point that it can be readily attached to the search light carried by the head of the motor cycle or any other part of the motor cycle.

While I have shown this specific form of bracket, it will be understood that the same could be slightly varied without departing from my invention.

Having thus described my invention what I claim and desire to secure by Letters Patent is:

1. A bracket of the character described comprising a curved tank supporting body portion having at one side a vertical portion, having its sides converging to correspond with the auxiliary forks of the motor cycle, and means carried by the said vertical portion and adapted to secure the same to the forks of the motor cycle.

2. A bracket of the character described, comprising a curved tank supporting body portion, having at one side a vertical portion, having its sides converging to correspond with the auxiliary forks of the motor cycle, and bolts passing through said vertical portion, and adapted to secure the same to the forks of the motor cycle.

3. The combination with a motor cycle having the auxiliary forks beyond the head, of a bracket having a curved tank supporting body portion extending transverse the forks, and a straight vertical portion carried by one side and adapted to straddle the forks, and bolts passing through the straight portion between the forks and adapted to secure the bracket thereto.

4. The combination of a motor cycle having the usual auxiliary forks in front of the head of a curved tank supporting plate, extending transverse the fork one side thereof having a vertical disposed portion adapted to straddle the fork, a plate in rear of the fork, and having outwardly curved edges adapted to engage the vertical portion of the bracket, and bolts passing through the straight portion, and through the plate, and clamping the bracket to the fork.

5. The combination with a motor cycle having the usual auxiliary forks in front of the head, an enlarged curved body portion extending transverse the forks, and having at one edge a vertical disposed portion adapted to straddle the forks, and rest against the same, a plate in rear of the fork, and having its edges turned with outwardly turned portions engaging the rear face of the vertical portion of the bracket, bolts passing through the vertical portion of the bracket between the forks and through the plate, and clamping the same together against the fork, and means for attaching a presto-lite tank within said curved portion.

6. A bracket comprising a curved tank supporting portion having at one side a vertically disposed portion adapted to straddle the auxiliary forks of a motor cycle and bolts passing through said vertically disposed portion and adapted to secure the same to the forks of the motor cycle.

In testimony whereof I hereunto affix my signature in the presence of two witnesses.

GEORGE A. LEONARD.

Witnesses:
CHARLES E. ALLEN,
HARRY S. WEED.

Copies of this patent may be obtained for five cents each, by addressing the "Commissioner of Patents, Washington, D. C."